United States Patent [19]

Mahar, Jr. et al.

[11] Patent Number: 5,121,110

[45] Date of Patent: Jun. 9, 1992

[54] SOFT SENSOR MOUNTING

[76] Inventors: Michael A. Mahar, Jr., P.O. Box 80, Cedar Lake Rd., Clayville, N.Y. 13322; Brett B. Truett, 1902 Briar Ave., Utica, N.Y. 13501

[21] Appl. No.: 597,173

[22] Filed: Oct. 15, 1990

[51] Int. Cl.$^5$ ............................................. G08B 21/00
[52] U.S. Cl. ................... 340/693; 248/27.1; 248/560; 340/540; 340/686; 340/679
[58] Field of Search ............... 340/693, 680, 679, 686, 340/540; 248/27.1, 601, 548, 560, 573, 900

[56] References Cited

U.S. PATENT DOCUMENTS 2,490,483 12/1949 Simer .................................. 340/686

Primary Examiner—Glen R. Swann, III
Attorney, Agent, or Firm—Wall and Roehrig

[57] ABSTRACT

A contact protected mounting for non-contact proximity sensors has a pair of sleeves and a spring mounted about the sensor. One sleeve engages the sensor, and one engages the mounting bracket. The spring is mounted between the sleeve so as to allow the sensor to recess into the mounting when contacted by a machine part so as to eliminate any damage to the sensor itself. The sleeves are configured to mount about the body of the sensor and to be readily mounted within a mounting bracket or partition to properly monitor machine motion. Both axial and perpendicular machine motion is provided for.

14 Claims, 3 Drawing Sheets

SOFT SENSOR MOUNTING

BACKGROUND OF THE INVENTION

This invention relates to industrial inductive and capacitive non-contact proximity sensors, and more particularly, to a system for mounting sensors which provides protection from unintended contact and enhances operating capabilities.

In today's manufacturing setting, it is common to install solid state non-contact inductive and capacitive proximity sensors to monitor machine functions for their control by computer. Due to their relatively delicate construction, compared to industrial machine components, these sensors are vulnerable to destruction if they are struck by the machine components they are designed to detect but not contact. In many cases older machines are retro-fitted with computer controls and inductive/capacitive proximity sensors. Safe installation of these sensors in older machines, where inconsistent machine motions, due to wear and looser tolerances are encountered, is difficult. This is particularly true since these non-contact sensors have inherently small (2-30 mm) (0.079"-1.200") sensing ranges and must be mounted close to the part being monitored.

OBJECTS AND SUMMARY OF THE INVENTION

Accordingly, it is an object of the present invention to provide a system of mounting devices for the protection and increased operating capabilities of inductive and capacitive proximity sensors when installed to monitor machine motions.

It is another object of the present invention to overcome the limitations of the prior art.

It is a further object of this invention to provide a means of flexibly mounting non-contact proximity sensors so as to protect them if and when they come in contact with the machine components they monitor.

It is a still further object of the present invention to provide a kit for "soft mounting" non-contact proximity switches so as to allow them to safely make contact with the machine component they monitor while preventing their destruction and extending their usefulness.

It is yet another object of the present invention to provide a flexible mounting mechanism that can be incorporated into the design and manufacture of "non-contact" proximity sensors converting them into "contact-protected" devices with enhanced operating characteristics.

In one embodiment of the present invention, a cushioned mounting device consisting of two threaded sleeves, enclosing a spring, is provided for mounting a tubular threaded-body sensor, which when installed together, protects the sensor from damaging contact with oscillating machine components moving along the axis of the sensor.

BRIEF DESCRIPTION OF THE DRAWINGS

The invention will become better understood from the following description, taken in conjunction with the drawings, in which.

DETAILED DESCRIPTION OF A PREFERRED EMBODIMENT

Figure 1:
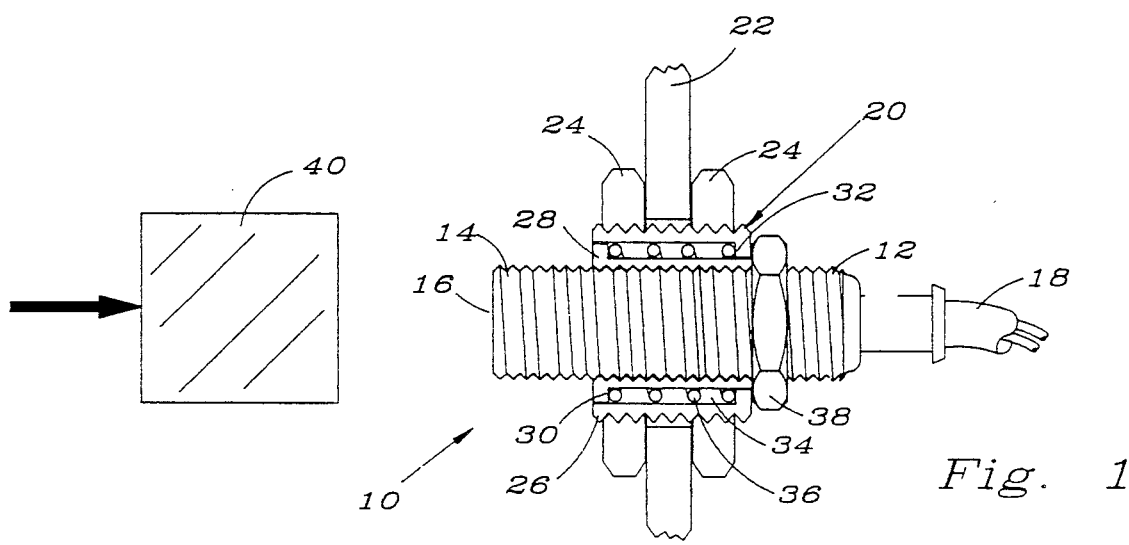
FIG. 1 is a cross-sectional view of a tubular threaded-body proximity sensor shown mounted in a cushioning device according to the present invention.
Figure 2:
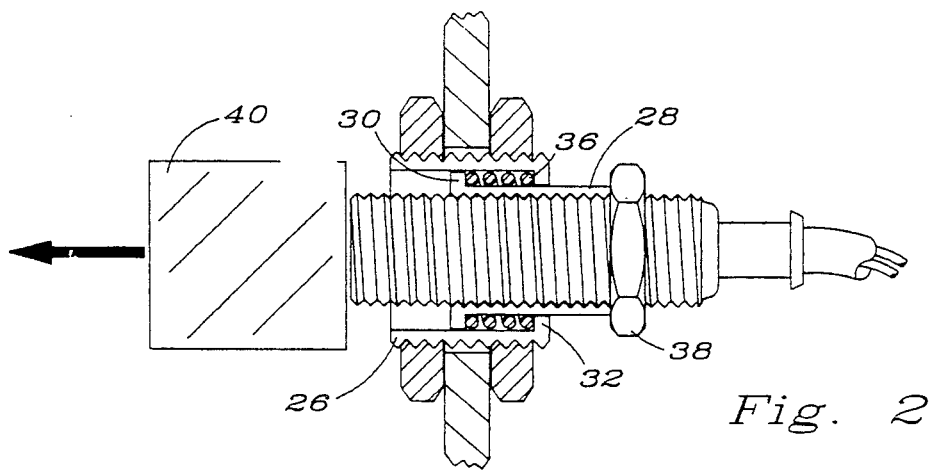
FIG. 2 is a cross-sectional view of a threaded tubular-body proximity sensor shown mounted in a cushioning device during contact with an axially moving machine component.

Referring now to FIGS. 1 and 2, there is shown a preferred embodiment of the present invention. The soft mounted sensor 10 comprises generally a proximity sensor in the form of a cylindrical housing 12 threaded on the exterior 14 and having at one end the proximity sensor 16 and at the other end a conductor 18 connecting the sensor to the instrumentation for the device on which the sensor is mounted. In a typical application, the sensor will have a diameter of approximately one-half inch and an overall length on the order of three inches. The typical sensor 16 may be an inductive or a capacitive type of proximity sensor which has an active sensing range of two to twenty millimeters. The sleeve 14 may be metal or plastic, as the case may be, and is generally threaded for ease of mounting in a bulkhead or bracket for positioning on a device to sense the limit of movement of a reciprocating slide or other movable element of the machine. As shown in FIG. 1, the housing 12 is positioned within a sleeve assembly, generally indicated at 20, which usually is located on a housing or bracket 22 by a pair of mounting nuts 24, one on each side of the bracket or wall 22. The nuts are threaded on the outer side of the sleeve 26 which forms the outer part of the sleeve assembly 20. The outer sleeve 26 is positioned about an inner sleeve 28 which has a flange 30 at the left hand end of FIG. 1 and which forms an annular space between the inner sleeve and the outer sleeve, closed at one end by the flange 30 and at the other end by a flange 32 on the outer housing 26. The inner housing 28 generally is internally threaded so as to mate with the threads 14 of the sensor housing 12 and position the inner sleeve at the desired location along the sensor 12. Positioned within the space 34 between the inner and outer sleeves is a spring 36 which rests between the flanges 30 and 32 to keep the two sleeves in the position shown in FIG. 1. A jam nut 38 is threadably mounted on housing 12 to retain the outer sleeve in position over top of the inner sleeve as shown in FIG. 1 and to lock inner sleeve 28 in position on the sensor housing 12.

If the jam nut 38 is removed from the housing 12, the entire housing and the inner sleeve 28 can then be removed from the outer sleeve and the spring replaced or assembled, as the case may be.

Referring specifically now to FIG. 2, it can be seen how if a movable object 40, as it approaches the proximity sensor 10, fails to stop in time, it will cause the sensor housing 12 to retract within the outer sleeve 26, compressing the spring 36, as may be seen in FIG. 2, up until the spring is completely compressed between the two flanges 30 and 32. Up to that point, the sensor housing 12 can be moved axially within the outer sleeve 26 without damage thereto.

Figure 3:
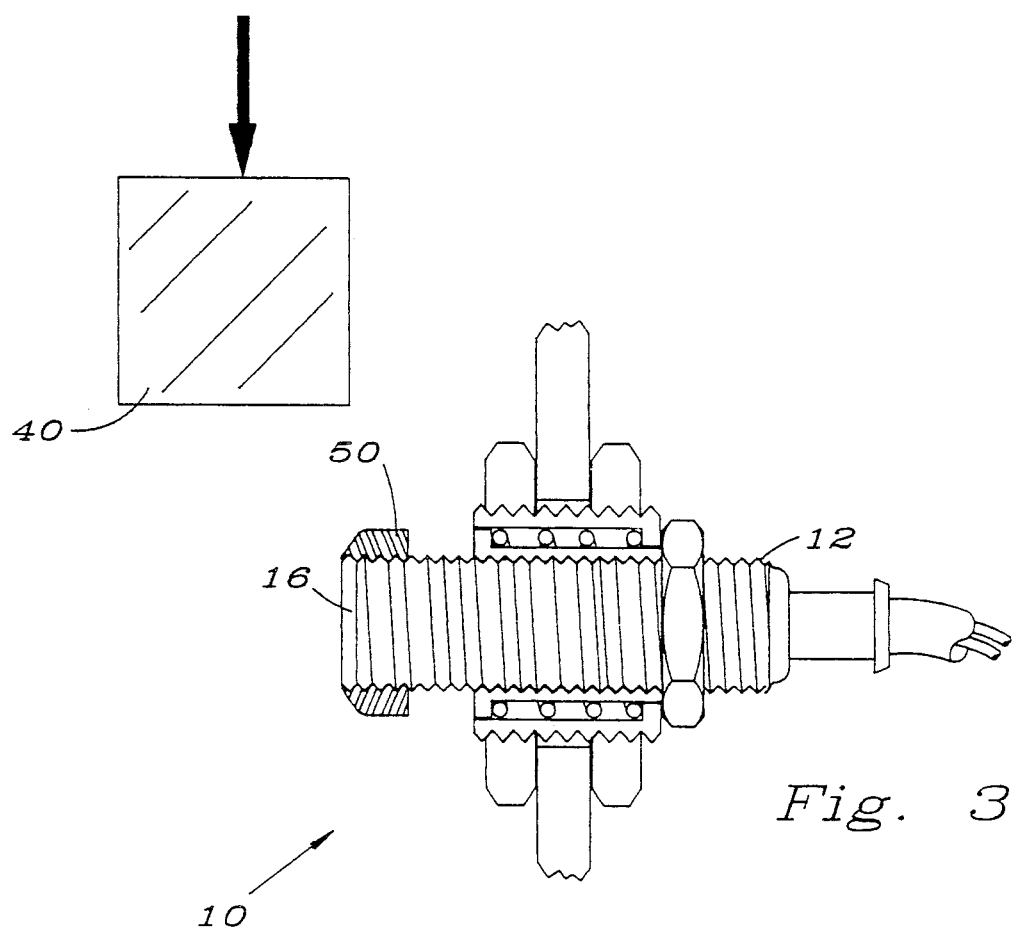
FIG. 3 is a cross-sectional view of a tubular threaded-body proximity sensor shown mounted in a cushioning device for the incidental contact with a radially moving (oscillating) machine component.
Figure 4:
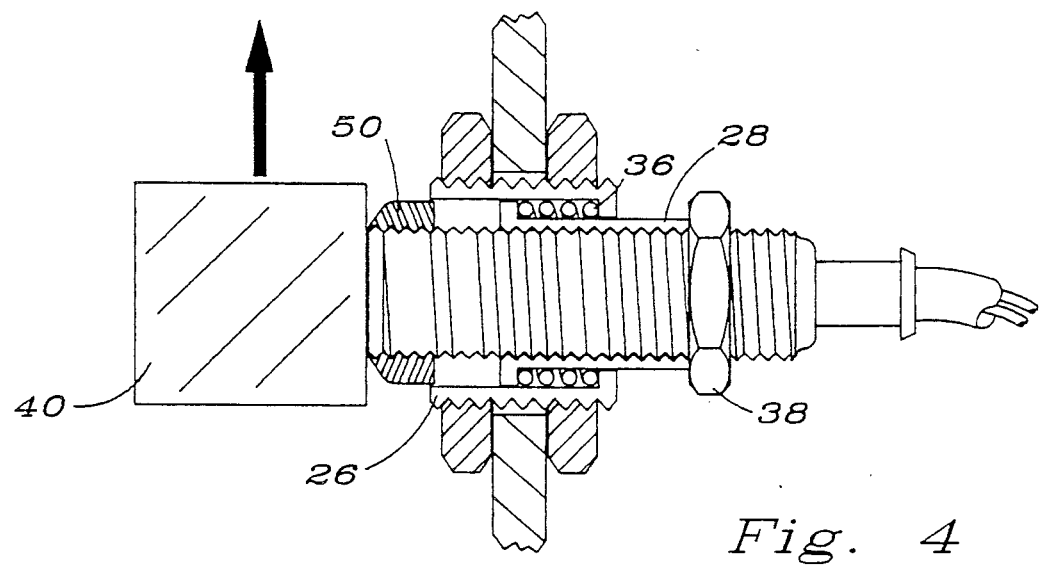
FIG. 4 is a cross-sectional view of a tubular threaded-body proximity sensor shown mounted in a cushioning device during contact with a radially moving machine component.

Referring now to FIGS. 3 and 4, there is shown a mounting for use in sensing the movement of a machine part transversely to or perpendicularly to the axis of the sensor. As may be seen in FIGS. 3 and 4, a protective cam 50 is mounted over the sensor 16 of the sensor assembly 10 so as to form a cam surface at an angle of approximately forty-five degrees with the axis of the sensor 10. The cam 50 then acts to cause the sensor to retract into the sleeve 28 as the machine part 40 overshoots its intended stopping point and actually contacts the nose of the sensor 10. As can be seen in FIG. 4, as the object 40 moves into contact with the nose of the proximity sensor 16, it moves the entire sleeve 12 to the right in FIG. 4, compressing the spring 36 and preventing damage to the sensor 16. As the object 40 moves back to its original position, the sensor is spring urged outwardly to its original position of FIG. 1 to continue to sense for movement in the transverse or axially directions, as the case may be. The mounting of the sleeve 12 of the sensor within the outer and inner sleeves 26 and 28 is the same as described in connection with FIGS. 1 and 2.

Figure 5:
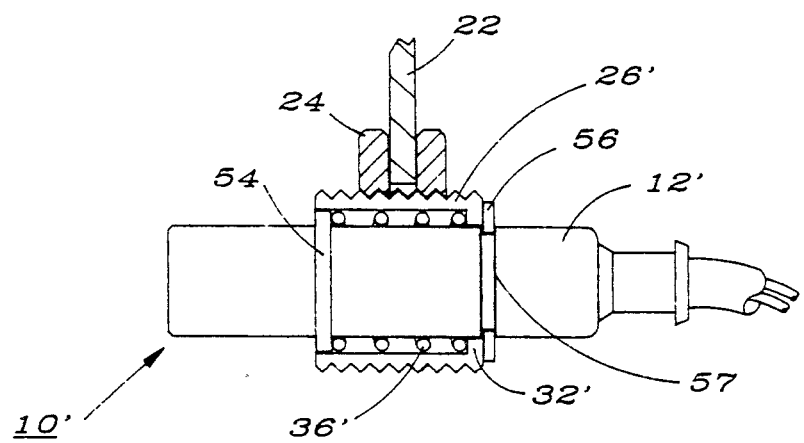
FIG. 5 is a cross-sectional view of another embodiment of a tubular sensor manufactured with an integral cushioning device in accordance with the present invention.

Referring now to FIG. 5, there is shown another embodiment of the present invention in which a contact protected mounting device is shown for a sensor having a smooth cylindrical outer surface. In this embodiment, the sensor housing 12' has a smooth outer surface and a first shoulder 54 formed in the outer sleeve 12' of the sensor 10'. The shoulder 54 forms a forward flange against which a spring 36' can act to provide the resilient mounting for the sensor 10'. Shoulder 54 acts in a similar fashion to the flange 30 on the inner sleeve of the device of FIGS. 1 and 2. Also positioned in a groove 57 in the housing 12' is a snap ring 56 which acts as the jam nut or confining nut for the assembly similar to the jam nut 38 of FIGS. 1 and 2. As may be seen, the outer sleeve 26' has a flange 32' at the right hand end in FIG. 5 which is positioned to cooperate with the spring 36' to provide the resilient mounting for the sensor 10' and permit the sensor 10 to be retracted into the sleeve 26'. It will be appreciated that with the sleeve 26' mounted in a bulkhead or bracket similar to the mounting of FIG. 1 that when a machine part contacts the left-hand end of the sensor 10' in FIG. 5, it will cause it to move into the sleeve 26' until the spring 36' is totally compressed. This offers a degree of contact protection to the sensor 10' so that it will not be destroyed by accidental contact by a machine moving part such as 40 in FIGS. 1 and 2.

Figure 6:
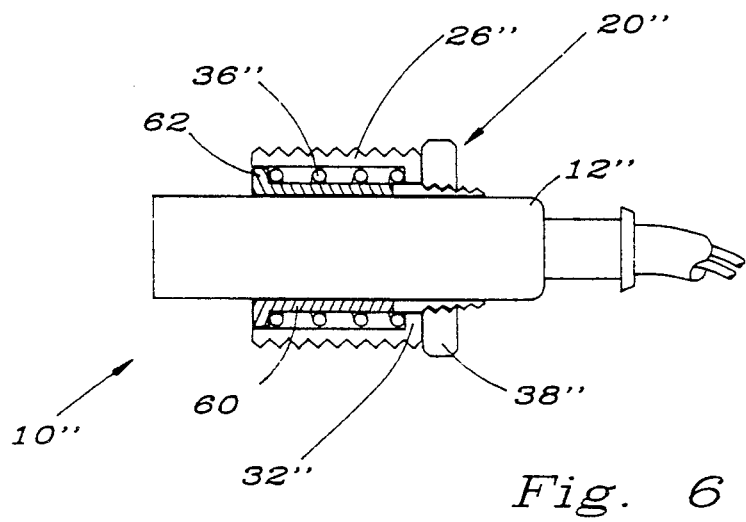
FIG. 6 is a cross-sectional view of a tubular non-threaded sensor cushioned mounting device.
Figure 7:
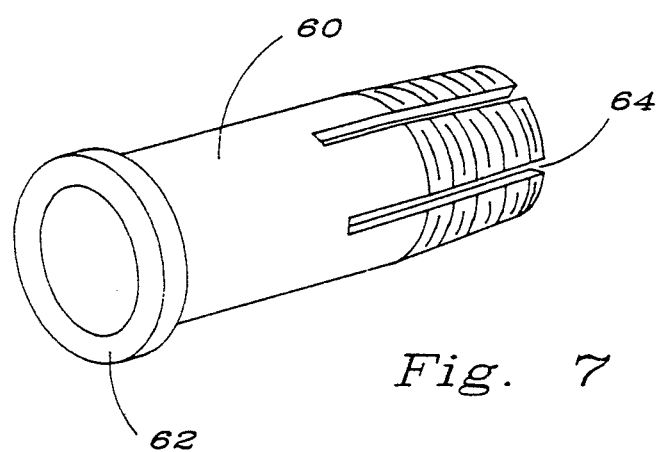
FIG. 7 is a perspective view of the sleeve of FIG. 6.

Referring now to FIGS. 6 and 7, there is shown another embodiment of the present invention for use in mounting unthreaded sensor members 10" in a bulkhead or bracket, as the case may be. In this case, the sleeve assembly 20" comprises an outer sleeve 26" which has a flange 32" at the right-hand end of FIG. 6, and which is threaded on the exterior surface for engagement by the usual mounting nuts, such as 24 in FIGS. 1 and 2. An inner sleeve 60 having a flange 62 on the left-hand end in FIG. 6 is provided to receive therein the sensor body 12" and to capture between the inner and outer sleeves the spring 36" in a manner similar to the prior embodiments. The inner sleeve 60 is positioned about the body 12" and held in the desired fixed position by jam nut 38" which is threaded about the right-hand end of the sleeve 60. As may be seen in FIG. 7, the sleeve 60 has a flange 62 at one end, and is threaded at the other end. In addition, four slots 64 are cut therein so that the threaded portion can be clamped about a housing positioned therein as nut 38" is tightened up onto the threaded portion of the sleeve. The threads, as may be seen in FIG. 6 are tapered so that as the jam nut is tightened onto the threads, it will compress the individual fingers of the right-hand end of the sleeve to cause them to clamp and frictionally engage about the sleeve 12".

The operation of the embodiments of FIGS. 5-7 is essentially the same as that of FIGS. 1-4 with the embodiment of FIG. 5 being essentially an integral unit built in to the sensor unit and FIG. 6 being an add-on kit that can be used with a variety of sensor configurations. It will be seen that regardless of the type of sensor or the particular sensor configuration, a resilient mounting has been provided for the sensor to protect it against undesired impact and damage due to over-traveling of the machine toward the sensing position of the proximity sensing device. Other types of sensors such as pneumatic, radiation, light, and the like which must be protected from damage due to over travel of the sensed object may advantageously be mounted in accordance with the present invention.

While this invention has been explained with reference to the structure disclosed herein, it is not confined to the details as set forth and this application is intended to cover any modifications and changes as may come within the scope of the following claims.

What is claimed is:

1. A non contact proximity sensor for detecting the approach of a moving object having inherent erratic motion such that damaging contact is sometimes unavoidable comprising in combination:
    a small elongated sensor member enclosed in a housing;
    mounting means for positioning said housing adjacent a moving object including;
    a hollow outer sleeve adapted to be fixed to a frame member adjacent the moving object;
    an inner sleeve slidably mounted within said outer sleeve for axial movement therein;
    means for securing said inner sleeve to said housing;
    resilient biasing means for urging said inner sleeve to move out of said outer sleeve; and
    stop means for limiting the movement of said inner sleeve within said outer sleeve;
    so that when a moving object approaches, a frame mounted proximity sensor and strikes said sensor, it will resiliently yield by retracting into the outer sleeve without damage to said sensor.

2. A proximity sensor according to claim 1 wherein said sensor member housing is cylindrical in shape and threaded on the exterior and said stop means includes a nut threaded on said housing, a first flange member on one end of said inner sleeve, and a second flange member on the other end of said outer sleeve.

3. A proximity sensor according to claim 2 wherein said resilient biasing means comprises a helical spring disposed about said inner sleeve and within said outer sleeve between said first and second flange members on said inner sleeve and said outer sleeve.

4. A proximity sensor according to claim 1 further including a cam member mounted on the sensing end of the proximity sensor housing and having a cam surface disposed at an acute angle to the axis of said sensor so that an object moving at right angles to the axis of said sensor and contacting said cam member will move said sensor into said outer housing.

5. A proximity sensor according to claim 4 wherein said cam member is a truncated cone mounted on the sensing end of said sensor.

6. A proximity sensor according to claim 5 wherein said sensor member housing is cylindrical and threaded on the exterior thereof and said cone is threadably engaged about the sensing end of said sensor.

7. A proximity sensor according to claim 1 wherein said sensor housing is an elongated smooth cylindrical tube and said inner sleeve has a flange at one end, a plurality of tapered split fingers at the other end threaded on the outer surface thereof and a jam nut positioned about said fingers for compressively causing said fingers to engage about said cylindrical tube to fix said sleeve thereto.

8. A proximity sensor according to claim 7 wherein said jam nut forms one of the stop means for limiting travel of said sensor within said outer sleeve.

9. Resilient mounting means for a proximity sensor to mount said sensor adjacent a moving object and to protect the sensor from accidental damaging contact comprising:
    an outer mounting sleeve adapted to be mounted in a frame member;
    an elongated proximity sensor mounted within said outer mounting sleeve for axial movement therethrough;
    means for resiliently biasing said sensor into an extended position relative to said outer mounting sleeve; and
    stop means for limiting the axial movement of said sensor relative to said outer mounting sleeve.

10. Mounting means according to claim 9 wherein said means for resiliently biasing said sensor includes:
    a flange on one end of said outer mounting sleeve;
    a spring member disposed within said outer mounting sleeve engaging on one end said flange and adapted to surround said elongated sensor positioned in said sleeve;
    a first flange ring formed on said elongated sensor positioned in said outer mounting sleeve to engage the other end of said spring; and
    a second flange ring spaced apart from said first ring and fixed on the elongated sensor outside of said sleeve to resiliently keep said sleeve in engagement about said sensor.

11. Mounting means according to claim 9 further including an inner sleeve mounted about said sensor positioned within said outer mounting sleeve and adapted for axial movement therein; a first flange formed on one end of said outer mounting sleeve and a second flange formed on the corresponding opposite end of said inner sleeve;
    spring means disposed about said inner sleeve within said outer mounting sleeve to engage said flanges and bias said inner sleeve and sensor to an extended position relative to said outer mounting sleeve.

12. A proximity sensor according to claim 11 wherein said inner sleeve is threaded on the outer surface of the end opposite said second flange and has a series of longitudinal slots formed in said threaded portion, and said stop means comprises a jam nut positioned about said inner sleeve threaded end to clamp said inner sleeve about said sensor.

13. A non-contact proximity sensor for detecting the approach of a moving object having inherent erratic motion, such that damaging contact is sometimes unavoidable, comprising in combination
    a small elongated sensor member;
    a hollow sleeve having a flange at one end adapted to be fixed to a frame member adjacent the moving object and sized to slidably receive therein said sensor member;
    a shoulder formed in the outer surface of said sensor member and sized to fit within said sleeve;
    stop means for limiting movement of said sensor member within said sleeve including a snap ring mounted in a groove in the outer surface of said sensor member spaced from said shoulder to limit movement of said sensor member out of said sleeve; and
    resilient biasing means mounted about said sensor member between said sensor member shoulder and said sleeve flange for urging said sensor member to move out of said sleeve.

14. A non-contact proximity sensor for detecting the approach of a moving object having inherent erratic motion such that damaging over-travel is sometimes unavoidable comprising:
    a sensor member for sensing the presence of an object;
    mounting means for positioning said sensor member adjacent a moving object;
    resilient biasing means operatively connected to said sensor member and mounting means urging said sensor member into a first sensing position;
    said resilient biasing means being formed to allow said sensor member to move to a second sensing position when contacted by said moving object while absorbing the shock of contact with the moving object to be detected so as to prevent damage to the sensor member.

* * * * *